United States Patent

Ranjan et al.

[11] Patent Number: 5,840,394
[45] Date of Patent: Nov. 24, 1998

[54] METHOD OF MANUFACTURING A THIN FILM MAGNETIC RECORDING MEDIUM HAVING LOW MRT VALUE AND HIGH COERCIVITY

[75] Inventors: Rajiv Yadav Ranjan, San Jose; Miaogen Lu, Fremont, both of Calif.

[73] Assignee: Komag, Incorporated, Milpitas, Calif.

[21] Appl. No.: 829,995

[22] Filed: Apr. 2, 1997

[51] Int. Cl.$^6$ ...................................................... G11B 5/66
[52] U.S. Cl. ...................... 428/65.3; 428/336; 428/611; 428/668; 428/673; 428/674; 428/694 TS; 428/694 TP; 428/694 TM; 428/900; 427/131; 427/132; 204/197.2
[58] Field of Search ................................. 428/65.3, 336, 428/611, 668, 673, 674, 694 TS, 694 TP, 694 TM, 900; 427/131, 132; 204/192.2

[56] References Cited

U.S. PATENT DOCUMENTS

| | | | |
|---|---|---|---|
| 5,543,221 | 8/1996 | Kitakami et al. | 428/332 |
| 5,580,667 | 12/1996 | Lal | 428/610 |
| 5,605,733 | 2/1997 | Ishikawa et al. | 428/65.3 |
| 5,693,426 | 12/1997 | Lee | 428/611 |

*Primary Examiner*—Leszek Kiliman
*Attorney, Agent, or Firm*—Skjerven, Morrill, MacPherson Franklin and Friel; Kenneth E. Leeds

[57] ABSTRACT

A method for manufacturing a magnetic disk includes the step of providing first and second magnetic layers on a substrate. The first magnetic layer comprises Co. The portion of the first magnetic layer comprising Cr, Ta, Ti, W, Zr or Hf, if any, is less than 7.5 atomic % of the first magnetic layer (and preferably less than 5 atomic %). The second magnetic layer also comprises Co, and more than 7.5 atomic % of the second layer is Cr, Ta, Ti, W, Zr or Hf (and preferably more than 10 atomic %). We have discovered that the first and second magnetic layers can be made very thin without having a great reduction in coercivity.

17 Claims, 3 Drawing Sheets

METHOD OF MANUFACTURING A THIN FILM MAGNETIC RECORDING MEDIUM HAVING LOW MRT VALUE AND HIGH COERCIVITY

CROSS-REFERENCE TO RELATED APPLICATIONS

This application is related to our co-pending U.S. patent application entitled "Method of Manufacturing a Thin Film Magnetic Recording Medium Having Low MrT Value and High Coercivity", U.S. Ser. No. 08/832,028, now pending, filed on the same day as the present application and incorporated herein by reference.

BACKGROUND

This invention relates to magnetic recording media, and more specifically, to a method for making a thin film magnetic recording medium having a low MrT value and a high coercivity Hc.

Industry constantly strives to increase the recording density in magnetic disks. We expect that to further increase recording density, future magnetic recording media will have low MrT values. (MrT equals magnetic remanence Mr times the thickness T of the magnetic film in a magnetic recording disk.) Media with a MrT value as low as 0.75 memu/cm$^2$ are presently under development.

One method for reducing MrT for a given magnetic alloy is to reduce thickness T. (Mr for a given alloy is constant. Thus, one adjusts MrT for a given alloy by adjusting thickness T.) Unfortunately, as thickness is reduced such that MrT is less than about 0.8 memu/cm$^2$, coercivity Hc starts to drop. We believe that at present, reducing MrT to 0.75 memu/cm$^2$ or lower while maintaining Hc at 2300 Oe or higher may not be feasible using current technology, because Hc is extremely sensitive to thickness.

FIG. 1 illustrates a prior art magnetic disk 1 comprising an Al alloy substrate 2, a plated NiP alloy layer 3, a sputtered amorphous NiP alloy layer 4, a magnetic Co alloy layer 5, and a protective hydrogenated carbon overcoat 6. In disk 1, layers 4, 5 and 6 are formed by sputtering. (Sputtered NiP alloy layers such as layer 4 are discussed in U.S. Pat. No. 5,153,044, incorporated herein by reference. Further information concerning formation of layers 4 to 6 is provided in U.S. patent application Ser. No. 08/286,653, filed by Tu Chen, et al. on Aug. 5, 1994, now U.S. Pat. No. 5,658,659, assigned to Komag, Inc. and incorporated herein by reference.)

Magnetic cobalt alloy layer 5 typically comprises a mixture of Co, Ni, Pt, Cr, Ta and oxides such as $SiO_2$. Co comprises more than about 75 at. % of the magnetic film. Pt is added to the film to increase coercivity. Ni is added to enhance corrosion resistance without sacrificing too much saturation magnetization Ms. Oxides such as $SiO_2$ are added to the magnetic film to segregate the grains in the alloy. (As explained in the '653 application, this reduces the noise exhibited by the film.) Cr, Ta, Ti and W are often added to the magnetic alloy to prevent or retard corrosion.

We have discovered that sputtered magnetic alloy layer 5 includes a portion 5a which has a poor crystal lattice structure. The reason why portion 5a has a poor crystal lattice structure is that it is formed and nucleates on an amorphous layer (layer 4). (This effect may also occur with crystalline underlayers like Cr and its alloys, e.g. if the atmosphere during sputtering contains sufficient $O_2$ or $H_2O$, or there is sufficient delay between the time the underlayer is deposited and the time the magnetic layer is deposited. This may also happen if there is a sufficiently large lattice mismatch between the underlayer and the magnetic layer.) When layer 5 is fairly thick, portion 5a has a minimal effect on the magnetic characteristics of the disk. However, as layer 5 becomes thinner, portion 5a has a larger effect on the magnetic characteristics of disk 1. Thus, as layer 5 becomes thinner, portion 5a is responsible in large part for the drop in coercivity Hc.

SUMMARY

We have discovered a method for eliminating or minimizing the effect of a portion of a magnetic film containing a poor lattice structure. In accordance with our method, the magnetic film includes first and second magnetic layers having different compositions. The first magnetic layer has less than 7.5 at. % (total) of materials such as Cr, Ta, W, Ti, Zr or Hf. The second magnetic layer is formed on the first magnetic layer, and has greater than 7.5 at. % of these materials. We have discovered that because the first magnetic layer has less than 7.5 at. % of Cr, Ta, W, Ti, Zr or Hf, the first magnetic layer does not have a tendency to form with a poor lattice structure. (Materials such as Cr, Ta, W, Ti, Zr and Hf are usually added to a magnetic alloy to prevent or retard corrosion. Accordingly, we include these materials in the upper magnetic layer to perform this function. However, to the best of our knowledge, it has not previously been appreciated that these materials exacerbate the lattice structure problem at the bottom of the magnetic layer.)

In one embodiment of our invention, the first magnetic layer comprises less than 5 at. % of Cr, Ta, W, Ti, Zr or Hf whereas the second magnetic layer comprises more than 10 at. % of Cr, Ta, W, Ti, Zr or Hf.

DETAILED DESCRIPTION

Figure 2:
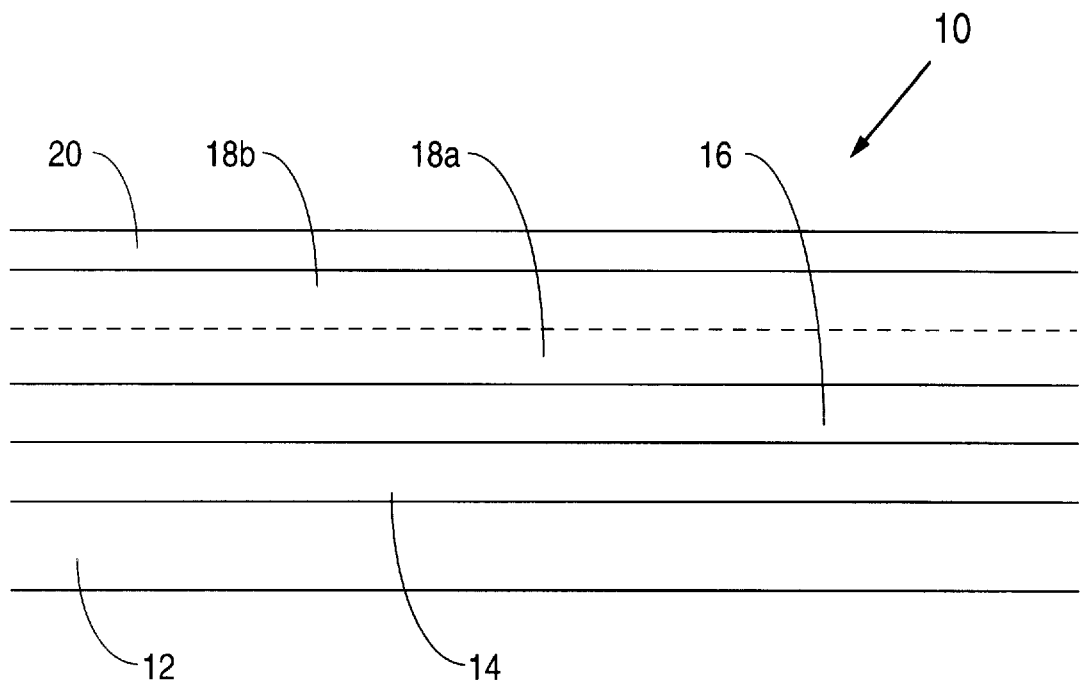
FIG. 2 illustrates in cross section a magnetic disk constructed in accordance with our invention including first and second magnetic layers.

FIG. 2 illustrates a magnetic disk 10 in accordance with our invention. Magnetic disk 10 includes an Al alloy substrate 12 electroless plated with a NiP layer 14. Layer 14 is typically 8 μm thick. Instead of using Al alloy substrate 12 and plated NiP layer 14, other materials can be used, e.g. glass, sintered carbon, ceramic or other appropriate materials. Layer 14 is typically textured in an appropriate manner to reduce stiction.

Disk 10 also includes a sputtered NiP layer 16. In lieu of including P, layer 16 can include Ni with materials other than P, e.g. as described in above-incorporated U.S. Pat. No. 5,153,044. Also, layer 16 can include oxides such as $SiO_2$ or $Al_2O_3$, e.g. as described in above-incorporated U.S. patent application Ser. No. 08/286,653, now U.S. Pat. No. 5,658,659. These materials cause layer 16 to include isolated regions of NiP separated from one another by $SiO_2$, e.g. as described in the '659 patent.

Above layer 16 are first and second magnetic cobalt alloy layers 18a, 18b, and a protective overcoat 20. Protective overcoat 20 can be hydrogenated carbon, e.g. as discussed in European patent application EP 0 440 259 A2, $ZrO_2$ as discussed in U.S. Pat. Nos. 4,929,500 and 4,898,774, or other appropriate materials. (The '259 application and the '500 and '774 patents are incorporated herein by reference.)

Layers 18a and 18b are typically cobalt alloys having a hexagonal close-packed crystal structure. In one embodiment, layer 18a is between 0.5 and 20 nm thick and comprises more than 75 at. % Co and less than 7.5 at. % (total) of Cr, Ta, W, Ti, Zr or Hf. Layer 18b is between 0.5 and 50 nm thick and comprises more than 75 at. % Co, and more than 7.5 at. % Cr, Ta, W, Ti, Zr or Hf. Of importance, because layer 18a has less than 7.5 at. % (and preferably, less than 5 at. %) Cr, Ta, W, Ti, Zr or Hf, layer 18a does not tend to have the poor crystal lattice structure described above. (We are not presently sure exactly why the Cr, Ta, W, Ti, Zr and Hf content affects the crystal lattice structure of a magnetic film.)

Because layer 18b is formed on layer 18a in an epitaxial relation with layer 18a, and layer 18a has a good lattice structure, layer 18b has a good lattice structure. This is true even though layer 18b has more than 7.5 at. % (and preferably more than 10 at. %) Cr, Ta, W, Ti, Zr and Hf. Thus, one can add these materials to layer 18b, and obtain the advantage of reduced corrosion in the magnetic disk, without suffering the consequence of a poor lattice structure, and the attendant drop of coercivity for low film thicknesses.

Figure 1:
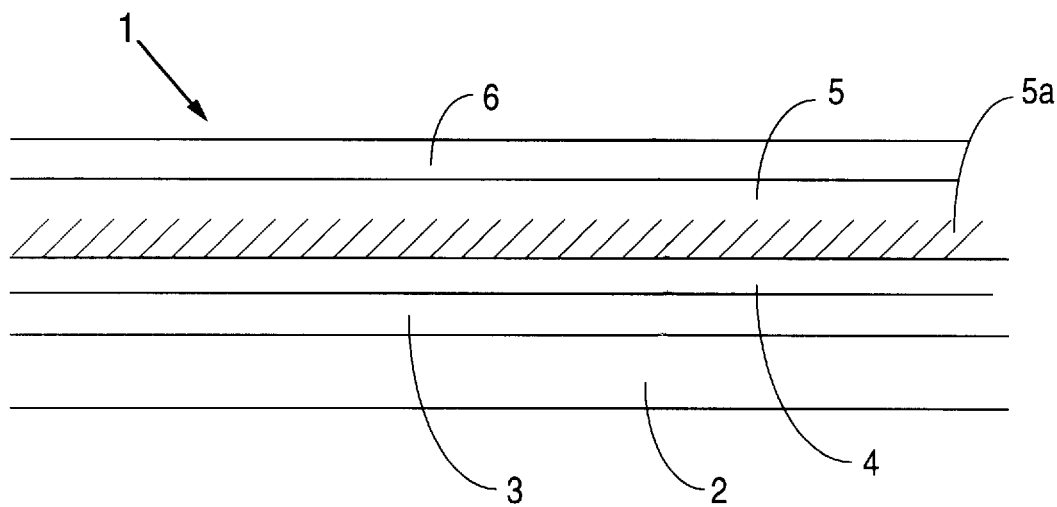
FIG. 1 illustrates in cross section a magnetic disk constructed in accordance with the prior art.
Figure 3:
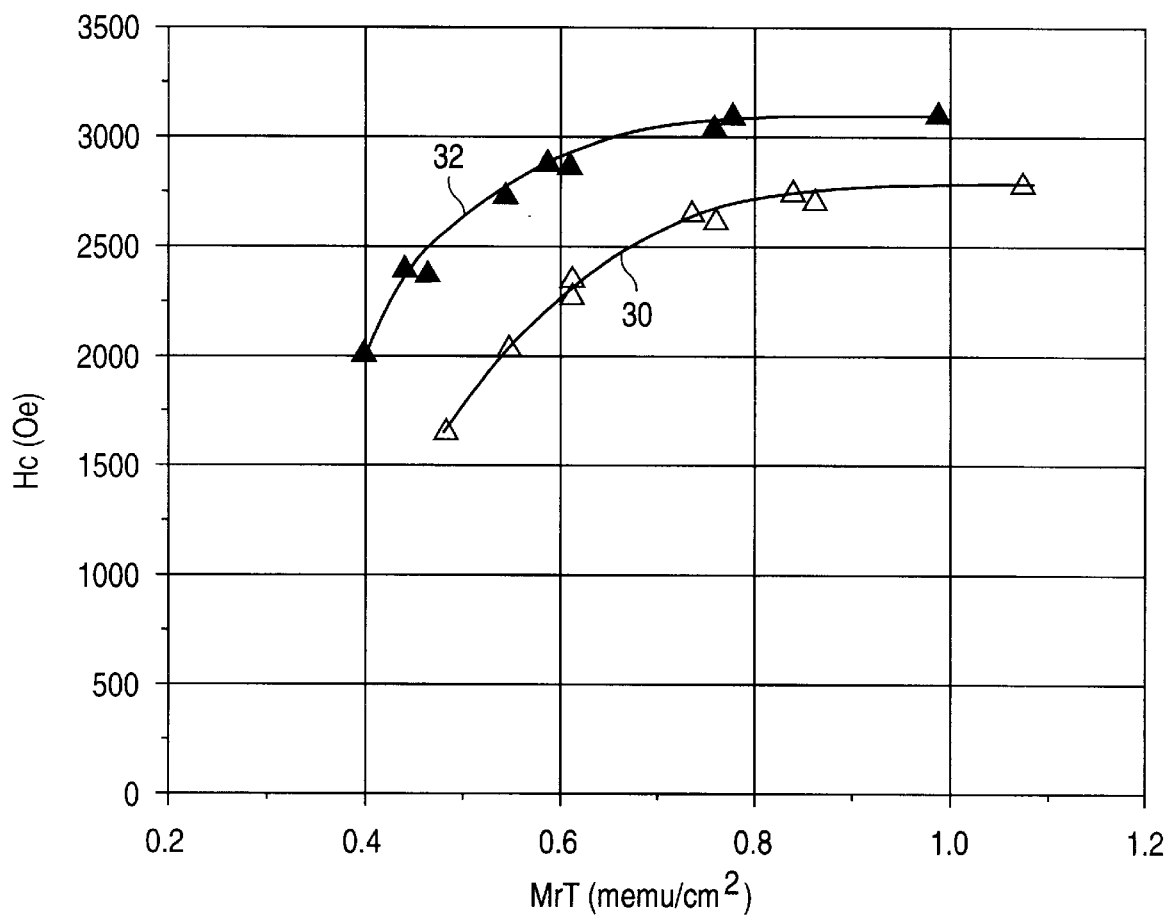
FIG. 3 illustrates the relation between coercivity Hc and MrT for a magnetic disk in accordance with the prior art and a magnetic disk in accordance with our invention.

FIG. 3 shows the relation between the MrT of prior art magnetic films (e.g. film 5 shown in FIG. 1) and the coercivity Hc of the film (see curve 30). The magnetic films corresponding to curve 30 comprised $Co_{72}Cr_{11}Pt_{13}(SiO_2)_4$, and were sputtered onto a layer comprising 98 wt. % NiP and 2 wt. % $Al_2O_3$. The $NiP/Al_2O_3$ was sputtered in an argon atmosphere at a pressure of 20 millitorr to a thickness of 40 nm. The $Co_{72}Cr_{11}Pt_{13}(SiO_2)_4$ was sputtered in an argon atmosphere at a pressure of 10 millitorr. As can be seen, for MrT values above 0.8 memu/cm$^2$, coercivity was about 2800 Oe. For MrT values below 0.8 memu/cm$^2$, coercivity dropped. For a MrT value of about 0.48 memu/cm$^2$, coercivity was about 1700 Oe. (Although not shown in FIG. 3, we performed a similar experiment using an argon atmosphere at a pressure of 15 millitorr to sputter the magnetic layer, and achieved substantially the same results as shown in curve 30 of FIG. 3.)

FIG. 3 also shows the relation between MrT and coercivity for a magnetic disk constructed in accordance with our invention (see curve 32). The disks of curve 32 comprised a $Co_{73}Ni_9Pt_{14}(SiO_2)_4$ magnetic layer (no Cr, Ta, W, Ti, Zr or Hf) covered by a $Co_{71}Cr_{11}Pt_{14}(SiO_2)_4$ magnetic layer. As can be seen, the coercivity for the disks of curve 32 was consistently higher than the disks of curve 30. For a MrT value of 0.6 memu/cm$^2$, the disks of curve 32 had a coercivity of about 2900 Oe, whereas the disks of curve 30 had a coercivity of about 2250 Oe. Further, the slope of curve 32 at an MrT of 0.6 memu/cm$^2$ is less than that of curve 30. Thus, it is easier to control Hc during manufacturing for a disk in accordance with our invention (curve 32) because the change in Hc caused by thickness changes is less than for curve 30.

Figure 4:
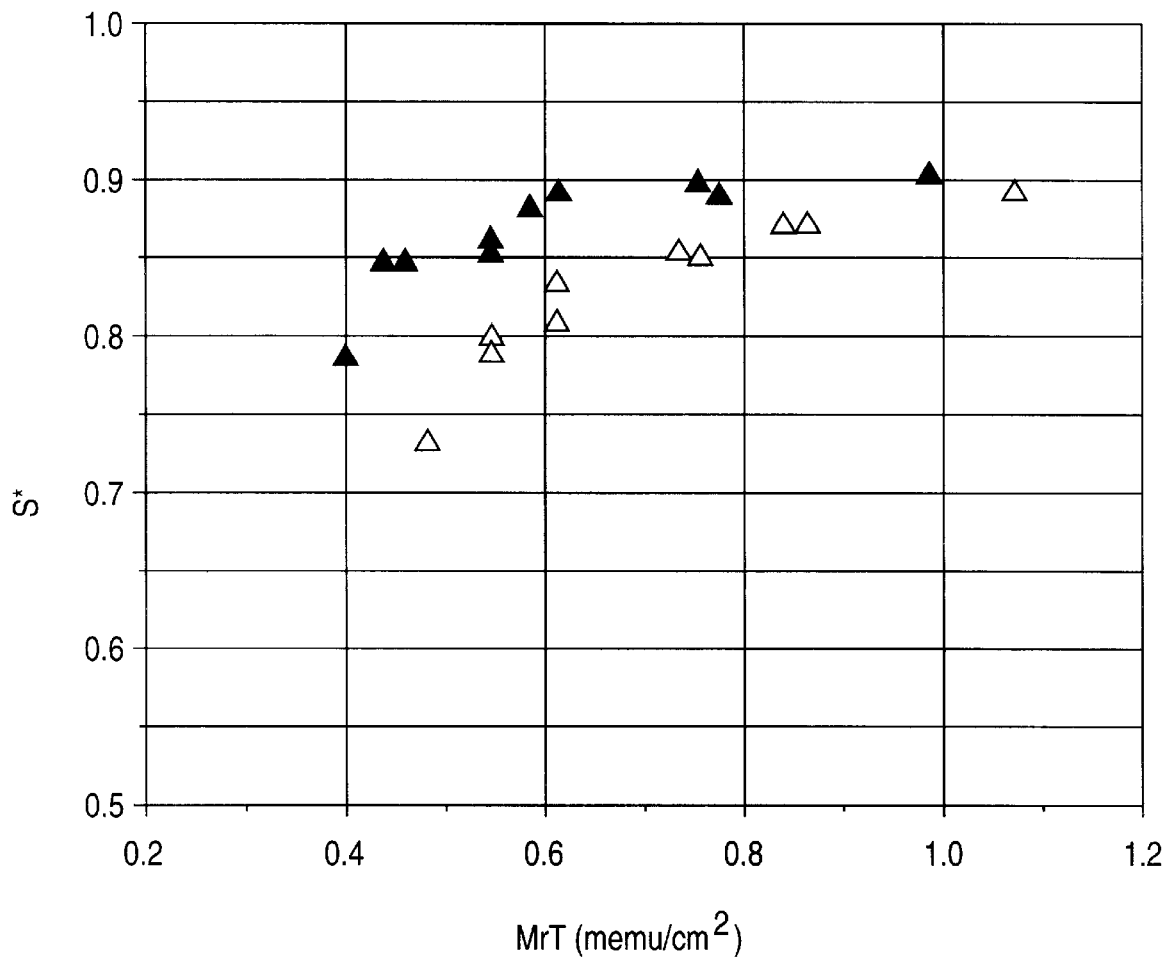
FIG. 4 illustrates the relation between squareness S* and MrT for a magnetic disk in accordance with the prior art and a magnetic disk in accordance with our invention.

FIG. 4 illustrates the relation between S* and MrT for disks in accordance with our invention (the dark triangles) and disks in accordance with the prior art (light triangles). The disks corresponding to the dark triangles were made in the same manner as the disks of curve 32, whereas the disks corresponding to the light triangles were made in the same manner as the disks of curve 30. As can be seen, disks in accordance with our invention had consistently higher S* values than disks in accordance with the prior art. At 0.6 memu/cm$^2$, disks in accordance with our invention had S* values of about 0.89, whereas prior art disks had S* values of about 0.84. (Higher S* values are desirable because they provide better overwrite (OW) and a narrower pulse width (PW50). This results in greater recording density.

While the invention has been described with respect to specific embodiments, those skilled in the art will recognize that changes can be made without departing from the spirit and scope of the invention. For example, the various layers on the magnetic disk can be formed using techniques other than sputtering, e.g. evaporation. Further, one can provide more than two magnetic layers. Accordingly, all such embodiments come within our invention.

We claim:

1. A method for manufacturing a magnetic disk comprising the steps of:

depositing a first magnetic layer on a substrate, said first magnetic layer comprising Co, and wherein the total atomic percentage of Cr, Ta, Ti, W, Zr or Hf, if any, is less than 7.5 at. %; and depositing a second magnetic layer onto said first magnetic layer in an epitaxial relation with said first magnetic layer, said second magnetic layer comprising Co and one or more materials selected from the group consisting of Cr, Ta, Ti, W, Zr and Hf, and wherein said one or more materials constitute more than 7.5 at. % of said second magnetic layer, said first and second magnetic layers being formed such that data can be recorded longitudinally therein.

2. Method of claim 1 wherein the total atomic percentage of Cr, if any, in said first magnetic layer is less than 5 at. %, and the total atomic percentage of Cr in said second magnetic layer is greater than 10 at. %.

3. Method of claim 1 wherein said second magnetic layer is formed directly on said first magnetic layer.

4. Method of claim 1 wherein said first magnetic layer is formed on an underlayer that is amorphous or substantially amorphous.

5. Method of claim 1 wherein said first magnetic layer is formed on a crystalline underlayer.

6. A magnetic disk comprising:

a substrate;

a first magnetic layer formed on said substrate, said first magnetic layer comprising Co, and wherein the total atomic percentage of Cr, Ta, Ti, W, Zr or Hf, if any, is less than 7.5 at. %; and a second magnetic layer formed on said first magnetic layer in an epitaxial relation with said first magnetic layer, said second magnetic layer comprising Co and one or more materials selected from the group consisting of Cr, Ta, Ti, W, Zr and Hf, and wherein said one or more materials constitute more than 7.5 at. % of said magnetic layer, said first and second magnetic layers being formed such that data can be recorded longitudinally therein.

7. The magnetic disk of claim 6 wherein the total atomic percentage of Cr, if any, in said first magnetic layer is less than 5 at. %, and the total atomic percentage of Cr in said second magnetic layer is greater than 10 at. %.

8. The magnetic disk of claim 6 wherein said second magnetic layer is formed directly on said first magnetic layer.

9. The magnetic disk of claim 6 wherein said first magnetic layer is formed on an underlayer that is amorphous or substantially amorphous.

10. The magnetic disk of claim 6 wherein said first magnetic layer is formed on a crystalline underlayer.

11. The magnetic disk of claim 6 wherein said one or more materials constitute more than 10 at. % of said second magnetic layer.

12. The magnetic disk of claim 6 wherein said one or more materials in said second magnetic layer constitute less than 25 at. % of said second magnetic layer.

13. The magnetic disk of claim 6 wherein the Cr, Ta, Ti, W, Zr or Hf in said first magnetic layer, if any, constitute less than 5 at. % of said first magnetic layer.

14. A method for manufacturing a magnetic disk comprising the steps of:

depositing a first magnetic layer on a substrate, said first magnetic layer comprising Co, and wherein the total atomic percentage of Cr, Ta, Ti, W, Zr or Hf, if any, is less than 7.5 at. %; and depositing a second magnetic layer directly onto said first magnetic layer, said second magnetic layer comprising Co and one or more materials selected from the group consisting of Cr, Ta, Ti, W, Zr and Hf, and wherein said one or more materials constitute more than 7.5 at. % of said second magnetic layer, said first and second magnetic layers being formed such that data can be recorded longitudinally therein.

15. Method of claim 14 wherein said first magnetic layer is between 0.5 and 20 nm thick and said second magnetic layer is between 0.5 and 50 nm thick, said first and second magnetic layers having a hexagonal close-packed crystal structure.

16. A magnetic disk comprising:

a substrate;

a first magnetic layer formed on said substrate, said first magnetic layer comprising Co, and wherein the total atomic percentage of Cr, Ta, Ti, W, Zr or Hf, if any, is less than 7.5 at. %; and a second magnetic layer formed directly on said first magnetic layer, said second magnetic layer comprising Co and one or more materials from the group consisting of Cr, Ta, Ti, W, Zr and Hf, and wherein said one or more materials constitute more than 7.5 at. % of said magnetic layer, said first and second magnetic layers being formed such that data can be recorded longitudinally therein.

17. The magnetic disk of claim 16 wherein said first magnetic layer is between 0.5 and 20 nm thick and said second magnetic layer is between 0.5 and 50 nm thick, said first and second magnetic layers having a hexagonal close-packed crystal structure.

* * * * *